(12) United States Patent  (10) Patent No.: US 8,339,726 B2
Koski et al.  (45) Date of Patent: Dec. 25, 2012

(54) UNIQUE MEDIA IDENTIFIER (75) Inventors: John A. Koski, Lafayette, CO (US); Matthew V. Ball, Broomfield, CO (US)

(73) Assignee: Quantum Corporation, San Jose, CA (US)

( * ) Notice: Subject to any disclaimer, the term of this patent is extended or adjusted under 35 U.S.C. 154(b) by 48 days.

(21) Appl. No.: 12/645,373

(22) Filed: Dec. 22, 2009

(65) Prior Publication Data
US 2011/0149438 A1 Jun. 23, 2011

(51) Int. Cl.
*G11B 5/584* (2006.01)

(52) U.S. Cl. ........... 360/77.12; 360/48; 360/49; 360/71; 360/75; 360/78.02

(58) Field of Classification Search .................. None
See application file for complete search history.

(56) References Cited

U.S. PATENT DOCUMENTS

| | | | |
|---|---|---|---|
| 5,136,592 A | | 8/1992 | Weng |
| 5,485,321 A * | | 1/1996 | Leonhardt et al. .............. 360/48 |
| 5,526,198 A * | | 6/1996 | Dodt et al. ...................... 360/48 |
| 5,940,854 A * | | 8/1999 | Green et al. .................... 711/112 |
| 6,031,671 A * | | 2/2000 | Ayres .............................. 360/40 |
| 6,282,040 B1 * | | 8/2001 | Bartlett ............................ 360/48 |
| 6,532,128 B1 * | | 3/2003 | Bui et al. ...................... 360/74.1 |
| 6,611,394 B1 * | | 8/2003 | Kato et al. ....................... 360/69 |
| 6,982,846 B2 * | | 1/2006 | Jaquette ........................... 360/69 |
| 7,003,589 B2 * | | 2/2006 | Erickson et al. .................. 710/8 |
| 7,038,874 B1 * | | 5/2006 | Jaquette et al. ................. 360/69 |
| 7,203,026 B2 * | | 4/2007 | Horimai ..................... 360/77.12 |
| 7,428,118 B2 | | 9/2008 | Duran |
| 2005/0231845 A1 * | | 10/2005 | Shirouzu ......................... 360/48 |
| 2005/0259349 A1 | | 11/2005 | Koski et al. |
| 2006/0012910 A1 * | | 1/2006 | Jaquette ........................... 360/69 |
| 2006/0082916 A1 * | | 4/2006 | Evans ............................. 360/55 |
| 2008/0128518 A1 * | | 6/2008 | Kubota et al. ................. 235/493 |
| 2009/0207515 A1 * | | 8/2009 | Cideciyan et al. .............. 360/31 |

* cited by examiner

*Primary Examiner* — Dismery Mercedes
(74) *Attorney, Agent, or Firm* — Roeder & Broder LLP; James P. Broder (57) ABSTRACT

An apparatus and method for providing a unique identifier for data storage media is disclosed herein. The servo track of the data storage media is encoded one or more times with media manufacturer's data. The media manufacturer's data includes a variety of information including the unique identifier. The unique identifier differentiates among different media manufacturers, different spools or pancakes from which a given media comes from, and different media within a given spool or pancake. The unique identifier scheme is configured to facilitate standardization among media manufacturers while providing error correction and flexibility for future changes in format.

28 Claims, 7 Drawing Sheets

| TMFD byte index | LDAT index (hexadecimal) | Definitions |
|---|---|---|
| 0 | 00 | Hex "00": ASCII NUL |
| 1 through 5 | 02 | Media unique encryption ID |
| 6 through 15 | 0C | Media vendor's name |
| 16 through 23 | 1E | Date of servo writing: yyyymmdd |
| 24 through 39 | 30 | Pancake identifier |
| 40 through 45 | 50 | Servo writer identifier |
| 46 through 69 | 5A | Servo verification statistics |
| 70 through 111 | 8C | Media vendor specific data |
| 112 through 127 | E0 | TMFD ECC |

UNIQUE MEDIA IDENTIFIER

BACKGROUND

The present invention relates to unique media identification. More particularly, the present invention relates to providing unique media identification for data storage media.

Unique identification of data storage media is useful for a variety of purposes. Unique identification facilitates tracking of manufacturing defect of a particular data storage media or manufacturing conditions common to a group of particular data storage media. Unique identification is also helpful to control which and how often a particular data storage medium is written to, for example, to ensure even wear and tear among a plurality of data storage media. Unique identification further facilitates the growing market for data encryption and data security, whether implemented as an additional feature and/or to comply with governmental regulations.

When manufacturers of data storage media provide a unique identifier, it is preferable not to incur added manufacturing cost overhead, increase cost of data storage media and/or its associated data read/write devices, or use memory space that could be used for data storage to provide the unique identifier. For example, with magnetic tape media, a cartridge shell encasing the magnetic tape medium may include a persistent memory component on the external side of the cartridge shell in order to provide unique cartridge identification. However, this persistent memory component comes at added cost to the cartridge (from additional components), added cost to the tape drives (from additional detectors to sense and read the persistent memory component), and added manufacturing cost overhead (from dedicated equipment that may be required to write the unique cartridge identification and decrease in throughput from having to servo format the tape and write the unique cartridge identification to the persistent memory component). As another example, a cartridge identifier may be provided internal to the cartridge shell by assigning a random number for each cartridge. The shortcoming of this approach is that there is a chance of two or more cartridges having the same identifier.

Thus, it would be beneficial to provide a unique identifier to each data storage media. It would be beneficial to have a unique identification scheme that could be implemented by various manufacturers. It would be beneficial for a unique identifier to be provided without incurring additional manufacturing cost overhead, at increased cost to the data storage media, at increased cost to the read/write drive, or sacrificing data capacity of the data storage media. It would be beneficial for a unique identifier to be readily accessible by the read/write drive while minimizing potential for tampering or alteration. It would be beneficial for a unique identification scheme to provide future flexibility for encoding additional information or modifications to accommodate changes in data storage formats.

BRIEF SUMMARY

One aspect of the invention relates to magnetic tape media. The magnetic tape media includes at least one data track and at least one servo track. The servo track includes at least one media identifier. The media identifier comprises a concatenation of three numbers associated with formatting the servo track by a media manufacturer. The media identifier is unique across different media manufacturers, different pancakes, and different tape lengths within each pancake.

Another aspect of the invention relates to a magnetic tape in a single reel tape cartridge. The magnetic tape includes a servo track encoded with a plurality of longitudinal words. Each of the longitudinal words defines a tape manufacturer's character. The tape manufacturer's characters from the plurality of longitudinal words represents tape manufacturer's data, which includes a unique media identifier.

Still another aspect of the invention relates to a method for obtaining tape manufacturer's data from a magnetic tape cartridge. The method includes obtaining a first longitudinal word from a first group of servo frames included in the magnetic tape cartridge, and extracting a first tape manufacturer's character from the first longitudinal word. The method also includes obtaining a second longitudinal word from a second group of servo frames included in the magnetic tape cartridge, and extracting a second tape manufacturer's character from the second longitudinal word. The method further includes generating a first segment of the tape manufacturer's data from the first and second tape manufacturer's characters. The first segment of the tape manufacturer's data is associated with a media identifier.

A cost effective media identifier scheme is provided that permits unique identification of portable storage media, aids in manufacturing quality feedback, and data encryption. The unique media identifier can be specified during the media manufacturing process. During regular use of the media, the media identifier—which is unique across different manufacturers, different pancakes, and different tape lengths within a pancake—permits unique identification of each of the media to ensure even wear and tear within a set of media, and to associate particular data to a particular cartridge. The media identifier also permits manufacturing process tracing. For example, if particular media exhibit defects or early failure rate, they may be traced back to a particular batch of pancakes and/or manufacturing conditions. Conversely, if particular media exhibit superior qualities, they can similarly be traced back to a particular batch of pancakes and/or manufacturing conditions. In this way, the media manufacturer can refine their material sourcing and/or manufacturing conditions to improve future media. Because the media identifier is a concatenation of numbers known to the manufacturer, using the media identifier as the cartridge identifier (as opposed to assigning consecutive numbers to cartridges in a given library) provides a ready-made encryption tool. For example, reading or writing data to a given cartridge may require entry of the media identifier, which outside persons is unlikely to know.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

The headings provided herein are for convenience only and do not necessarily affect the scope or meaning of the claimed invention.

DETAILED DESCRIPTION

Described in detail below is an apparatus and method for providing a unique identifier for data storage media. In one embodiment, a magnetic tape media is provided with a unique identifier during the manufacturing process. When the servo tracks of the magnetic tape media are being encoded with typical servo formatting information, the unique identifier is also encoded. The unique identifier is provided one or more times in a given tape medium. The unique identifier scheme is configured to facilitate standardization among media manufacturers while providing error correction and flexibility for future changes in format.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1:
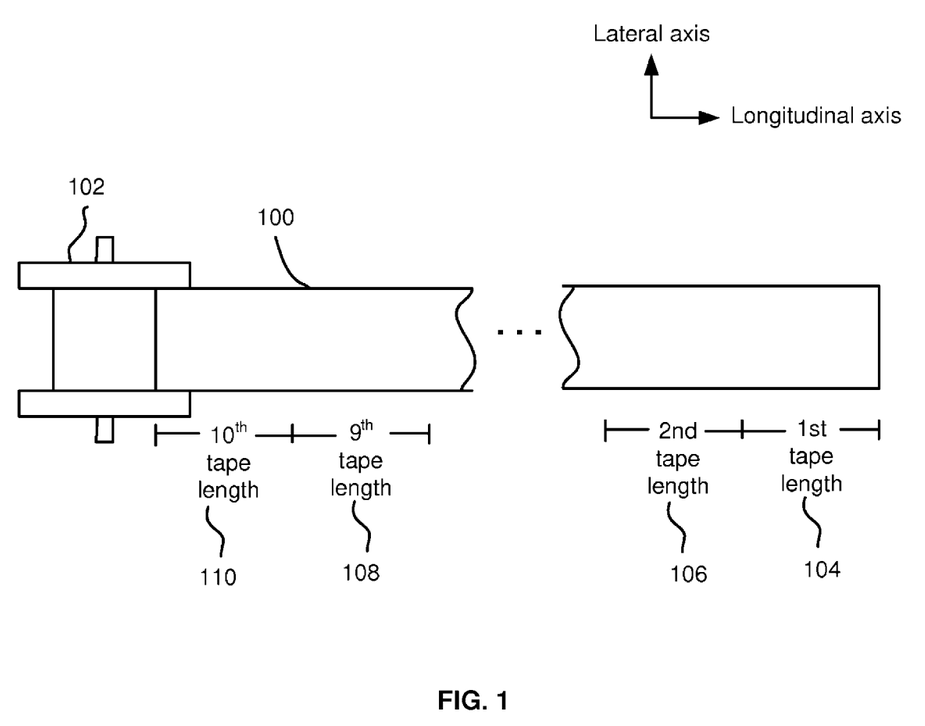
FIG. 1 illustrates an exemplary magnetic tape pancake.

Referring to FIG. 1, one embodiment of a portion of a system for manufacturing magnetic tape media is shown. A magnetic tape 100 is wound around a tape spool 102. The tape spool 102, also referred to as a pancake, is configured to be a temporary holder of the tape 100 until the tape 100 has been appropriately encoded (including unique identifier encoding) and is ready to be cut to length for encasement in individual tape cartridges (such as single reel tape cartridges). The tape 100 comprises a continuous length of tape, long enough to be cut into lengths (or segments) of tape for one or more tape cartridges. As an example, the tape spool 102 with the wound tape 100 is approximately four to five feet in diameter. The tape 100 (if unwound from the tape spool 102) may comprise a longitudinal length of approximately 8 kilometers, more than 10 kilometers, or some other length. It is long enough to be cut and packaged into approximately ten or more tape cartridges, such as a first tape length 104, second tape length 105, ninth tape length 108, and a tenth tape length 110.

The tape 100 includes at least one servo track and one or more data tracks that are positioned parallel to each other and also to the longitudinal axis shown in FIG. 1. The tape 100 may include 16, 20, 24 or more data tracks. While the data tracks are configured for multiple read/write operations (e.g., for data storage and access during regular use of a tape cartridge), the servo track is configured to be written by the manufacturer only.

In the media manufacturing process, before the tape 100 is cut to length for individual tape cartridges (e.g., while still at the pancake level), the servo track of the tape 100 is written to encode position information, unique media identifier, and other information. Although not shown in FIG. 1, servo writing components such as a servo write head, rollers, controllers, and sensors are used in a manufacturing facility to perform the servo track writing. Encoding the unique media identifier, as discussed in detail below, is performed with existing servo writing equipment. No additional servo write cost is incurred. The servo track is formatted with a variety of information including, but not limited to, lateral position information, longitudinal position information from the beginning of tape (BOT) to end of tape (EOT), vendor or manufacturer information, servo writing information, pancake information, verification information, error correction codes (ECCs), other vendor or manufacturer specific information, and other possible information. The lateral and longitudinal position information permit decoding of the lateral and longitudinal positions, respectively, of the tape for accurate data read and write operations and also facilitates access to the unique media identifier in the finished tape cartridge during regular use.

Figure 2:
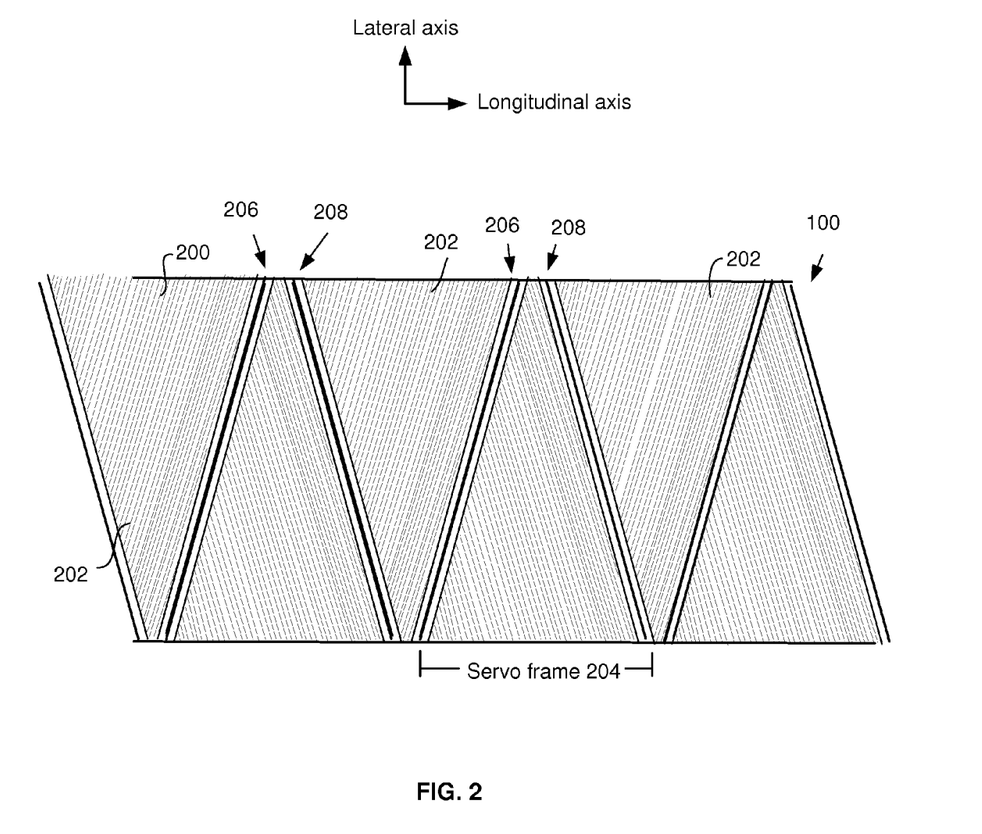
FIG. 2 illustrates a servo track included in the tape pancake of FIG. 1.

In one embodiment, the tape 100 includes a servo track 200. Referring to FIG. 2, the servo track 200 includes a periodic (e.g., a repeating, but not necessarily identical) sequence of magnetic flux transitions forming a pattern of detectable servo marks 202. Each period of repeating sequence of servo marks is generally referred to as a servo frame 204. Each servo frame 204 may include a tone field of repeating servo marks separated by a known distance and oriented at an azimuthal angle. The start and end of each servo frame may be identified by a pair of frame marks 206. Each servo frame may also include features distinct from the tone field, such as synchronization marks or a mid-frame mark 208.

When the servo track 200 is read by a drive head (e.g., servo read element/head in a drive head), the measured distance between successive frame marks 206 and the known geometry of the servo track (including the difference in the number of servo marks 202 with respect to different positions along the lateral axis) permit the lateral position of the servo read element/head to be determined. This in turn allows position determination and tracking of the data tracks (which are longitudinally parallel to the servo track 200) to enable proper read and write operations of narrow data track widths.

The longitudinal position of the tape is determined from longitudinal position values encoded in the servo track 200. During the manufacturing process at the pancake level, certain servo frames 204 of the tape 100 can be encoded with a unique longitudinal position value. This value typically starts with zero at the beginning of the tape spool 102 and increments along the longitudinal length of the tape 100 to a value of $10,000 \times l_{tape}$ at the other end of the tape spool 102, where $l_{tape}$ is the length of the tape 100 in meters on the tape spool 102 (as illustrated in FIG. 1). Hence, each of the tape cartridges resulting from a given tape spool 102 can have a different range of longitudinal position values or numbers. Alternatively, the maximum longitudinal position value for a tape spool 102 (or the maximum range of longitudinal position values) need not be constrained by the value $10,000 \times l_{tape}$. Instead, it may be open-ended depending on the number of servo tracks for the tape spool 102 and/or the length of the tape spool 102.

Figure 3:
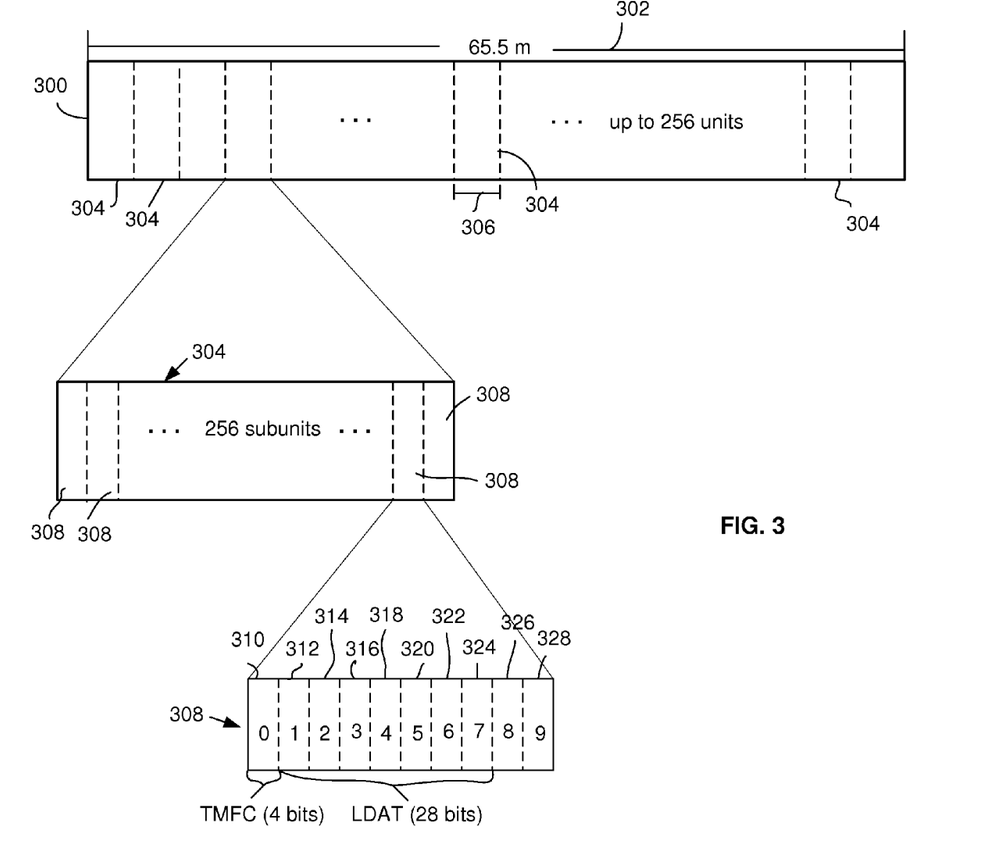
FIG. 3 illustrates a servo track of an exemplary tape cartridge.

Additionally during the manufacturing process at the pancake level, information relating to unique media identification is encoded in the servo track 200. To facilitate discussion of the additional encoded information, the following description is provided at the tape cartridge level. Turning to a formatted tape length that could be encased in an exemplary tape cartridge, assume as an example that a tape 300 (e.g., the first tape length 104 of the tape spool 102) has a tape length 302 of 65.5 meters, as shown in FIG. 3. One, two, more than two, or all portions of the servo track of the tape 300 can conceptually be denoted as data units 304. Each of these units 304 has a unit length 306 of approximately 0.256 meters. The units 304 can be adjacent to each other or there can be a gap between successive units 304. In one embodiment, the units 304 are typically located closer to the BOT than the EOT. In another embodiment, at least one of the units 304 may be located a short fixed distance from the BOT. In still another embodiment, the units 304 may be repeated for each 0.256 meters of tape, so that 256 of the units 304 may exist for the tape 300.

Each of the units 304, in turn, can be segmented into approximately 256 longitudinal data subunits, each of these subunits 308 having a subunit length of approximately 0.001 meters. Each of the subunits 308 may also be referred to as a longitudinal word. Lastly, each of the subunits 308 comprises 40 bits, in which each subunit 308 can be further segmented into ten sub-subunits of four bits each.

Each of the subunits or longitudinal words 308 comprises a tape manufacturer's character (TMFC) of four bits (sub-subunit 310), longitudinal data (LDAT) of 28 bits (sub-sub-units 312-322), and an unspecified field of eight bits (sub-units 324-326). Four bits can be referred to as a character; thus, each subunit or longitudinal word 308 comprises ten characters. A given servo frame 204 can be encoded with one character (or four bits) of information. In one embodiment, ten consecutive servo frames 204 are respectively encoded with the ten characters making up a given longitudinal word 308.

One character of the longitudinal word 308 comprises the TMFC, which is described in detail below, and generally encompasses at least a portion of the tape manufacturer's data (TMFD) including the unique media identifier. The TMFC field may be the first character of the longitudinal word 308. Seven characters of the longitudinal word 308 comprise the LDAT, and may immediately follow the TMFC field. LDAT provides longitudinal position information (from BOT to EOT of the cartridge) and aids in proper assembly of the TMFCs from the plurality of longitudinal words to form the complete tape manufacturer's data (TMFD). LDAT comprises a 28-bit binary number that increments for each successive longitudinal word of a given unit 304. When there are 256 longitudinal words in a given unit 304, the LDAT value for the first longitudinal word may be designated as zero and the next consecutive LDATs incrementing by one to a value of 255 for the LDAT of the last longitudinal word. Alternatively, the LDAT values may be 256×N, where N is an integer. The remaining two characters of the longitudinal word 308 may be an unspecified field reserved for future use or for encoding other/additional information. These two characters may follow the LDAT field, so that the LDAT field is sandwiched by the TMFC field on the one side and the unspecified field on the other side.

For example, if a servo frame is 100 micrometer in length, a longitudinal word could be encoded in 1 millimeter length of tape and thus the LDAT position resolution is 1 millimeter. And if 256 longitudinal words are used to encode the TMFD (the complete tape manufacturer data including the unique media identifier), then a 0.256 meter length of tape (e.g., the unit 304) would be used to encode those 256 longitudinal words.

For at least the reason that the LDAT values are different from each other for the longitudinal words of a given unit 304, all of the longitudinal words 308 of a given unit 304 are different from each other. The TMFD is assembled from the 256 longitudinal words of a given unit 304 (which corresponds to a span of 0.256 meter length of the tape 300, for example). The TMFD data set can be encoded once, twice, or more than two times in the servo track of the tape 300. Providing TMFD redundancy increases the likelihood that at least one instance of it will be correctly encoded, located, and/or read.

As mentioned above, the TMFD is assembled from all of the longitudinal words within a given unit 304. In particular, the TMFC values included in the longitudinal words are assembled in an order as specified by their respective LDAT values to form the TMFD. Traversing the tape from BOT toward EOT, the first character of the TMFD (e.g., the first TMFC value or character) can be located in the longitudinal word containing the LDAT value 256×N, where N is an integer (e.g., located in the first longitudinal word). The second character of the TMFD (e.g., the second TMFC value or character) can be located in the next longitudinal word (e.g., N is incremented by one; located in the second longitudinal word). This can be repeated for the remaining longitudinal words within a given unit 304, resulting in a complete set of TMFD data (totaling 256 characters) recovered from the 256 longitudinal words spanning a 0.256 meters of tape length. The TMFD of 256 characters can be expressed as 128 bytes, since each character is 4 bits in length. This 128-byte data set represents 128 ASCII symbols.

Figure 4:
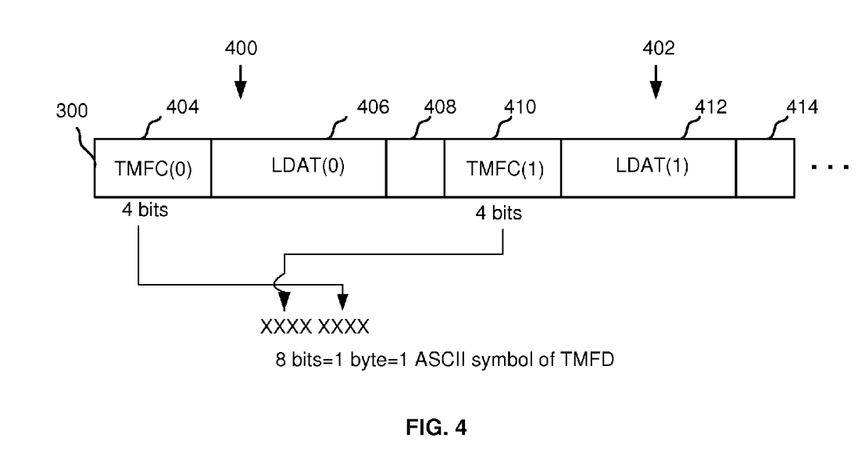
FIG. 4 illustrates a detailed view of the servo track of FIG. 3.

To illustrate the assembly scheme of the TMFC values, exemplary longitudinal words are shown in FIG. 4. The tape 300 includes a first longitudinal word 400 and a second longitudinal word 402. The first and second longitudinal words 400, 402 are included in the same unit 304 and are encoded in consecutive servo frames. The first longitudinal word 400 includes a TMFC character value 404 (denoted as field TMFC (0)), a LDAT value 406 (denoted as field LDAT(0)), and an unspecified field 408. The second longitudinal word 402 includes a TMFC character value 410 (denoted as field TMFC (1)), a LDAT value 412 (denoted as field LDAT(1)), and an unspecified field 414.

The TMFC character values 404, 410 represent a TMFC character pair or one byte of data, sufficient to define one ASCII symbol of the TMFD. The TMFC values contained in the remaining longitudinal words for the same unit 304 can be similarly paired. For example, TMFC(2) and TMFC(3) would constitute a character pair, and TMFC(4) and TMFC (5) would constitute another character pair. Within a given TMFC character pair, the TMFC character corresponding to the lower LDAT value comprises the low order nibble of the byte, followed by the TMFC character corresponding to the higher LDAT value for the longitudinal word pair comprising the high order nibble of the same byte. Hence, in FIG. 4, the TMFC character value 404 for TMFC(0) constitutes the low order nibble of the byte and the TMFC character value 410 for TMFC(1) constitutes the high order nibble of the byte. Together, the two characters form a byte of data.

Shown below is another way to express the assembly scheme of the TMFC characters to form the TMFD:

| TMFC character (binary) | In Longitudinal Word | Definition |
|---|---|---|
| XXXX | LDAT(hex)=(XXXX00) | Start of TMFD |
| XXXX | LDAT(bin)=(X...X0) | TMFD byte (0, 1, 2, 3), P |
| XXXX | LDAT(bin)=(X...X1) | TMFD byte (4, 5, 6, 7), P |
| ... | ... | ... |

Accordingly, the 128 TMFC character pairs for a given unit 304 collectively represent 128 ASCII symbols (each ASCII symbol represented by one byte of data). The 128-byte data set comprising the TMFD may be pre-defined into distinct groups so that a variety of tape manufacturer information can be encoded. For example, the first byte of the TMFD (corresponds to TMFC(0) and TMFC(1)) can be set to hexadecimal value "00" to specify a base definition for the remaining 127-bytes of the TMFD. A value other than hexadecimal "00" may also be specified, in which case an alternative definition for the remaining 127-bytes of the TMFD is applicable.

The base definition comprises pre-defined field definitions of what the specific bytes of the TMFD represents. It specifies which bytes belong to which field and the type of information contained within each field. Example fields include, but are not limited to, base definition identifier, media identifier, media manufacturer's name, servo writer identifier, the date on which the servo format was written, pancake identifier, servo writer identifier, error correction code, media manufacturer's definition, and other information important to media manufacturing or the manufacturer.

Figure 5:
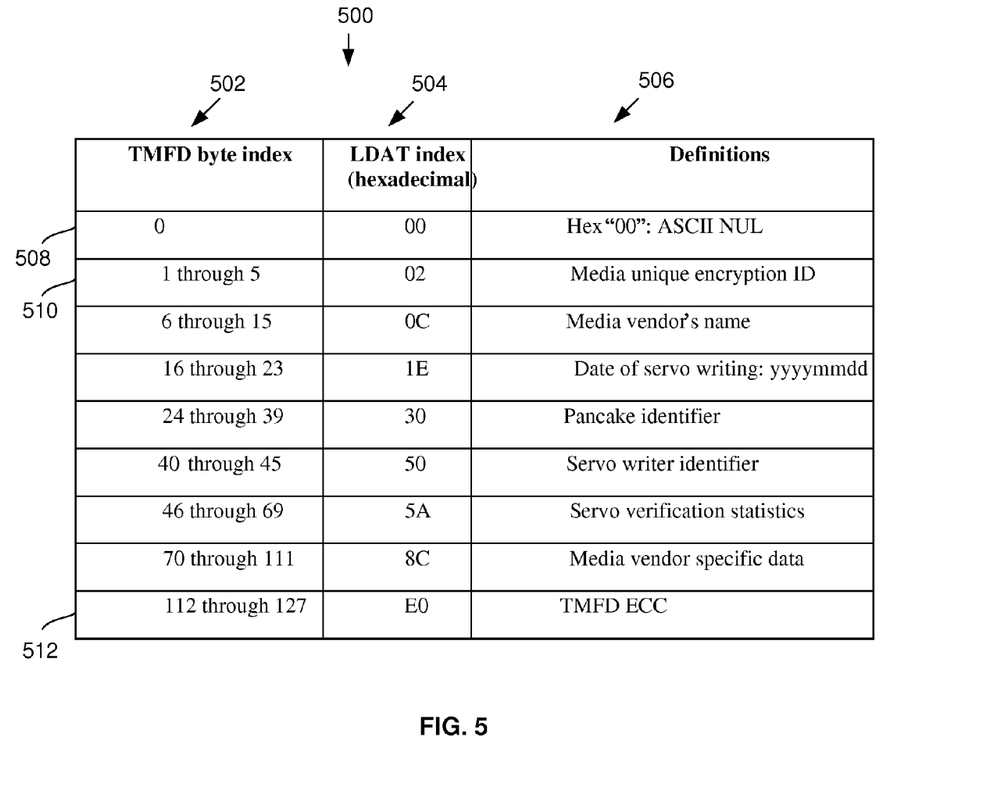
FIG. 5 illustrates a base definition for the tape manufacturer's data encoded in the servo track of FIG. 3.

FIG. 5 illustrates a base definition 500 (also referred to as TMFD data definition) for TMFDs containing hexadecimal "00" in its first byte. Note that a different base definition can be specified for TMFDs containing a different value in its first byte. One, two, or more distinct base definitions may exist. The base definition 500 serves as a key to make sense of the ASCII symbols comprising the TMFD. Absent the base definition, the string of 128 ASCII symbols may be incomprehensible.

The base definition 500 is shown in table form in FIG. 5. The base definition 500 includes a TMFD byte index column 502, a LDAT index column 504, and a definitions column 506. The TMFD byte index column 502 specifies the particular bytes and the group of bytes for each field within the TMFD. The LDAT index column 504 provides the starting LDAT index value for each of the fields in hexadecimal. For example, the first byte of the TMFD (TMFD(0)) starts at LDAT(00), and bytes 1 through 5 of the TMFD (TMFD(1, 2, 3, 4, 5)) starts at LDAT(02). The definitions column 506 provides a definition of the fields of the TMFD. Fields include, but are not limited to, the base definition identifier (e.g., hexadecimal "00"), unique media identifier, media vendor's name, date of servo writing, pancake identifier, servo writer identifier, servo verification statistic (optional or reserved for future use), media vendor specific data, and error correction code (ECC).

A base definition identifier field 508 provides that the first byte of the TMFD (TMFD(0)), which is located starting at LDAT(00), can be encoded with hexadecimal value "00." And if it is encoded with value "00," then the correct base definition for the TMFD is the base definition 500. A unique media identifier field 510 provides that the next five bytes of the TMFD (TMFD(1, 2, 3, 4, 5)), which is located starting at LDAT(02), specifies a unique media identifier for the media. An error correction code field 512 is defined by the TMFD (112 through 127) values, located starting at LDAT(E0).

The unique media identifier (also referred to as a media identifier, media encryption identifier, or unique media encryption identifier) represented by the TMFD(1, 2, 3, 4, 5) values comprises five-bytes of data (40 bits) formed by concatenating the servo writer head serial number, the servo writer pancake write-pass number, and the LDAT values at LDAT(23, 22, 21, 20, 19, 18, 17, 16). The subfield boundaries for the unique media identifier are shown in FIG. 6.

Figure 6:
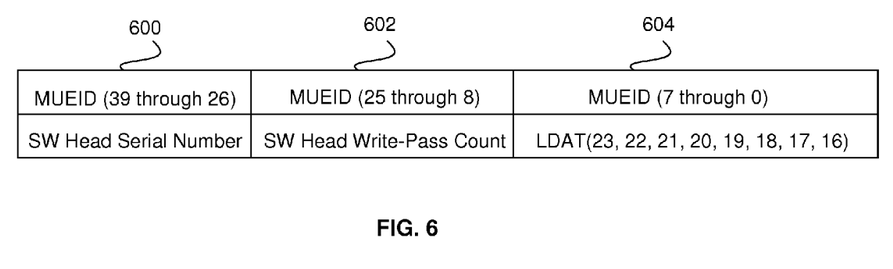
FIG. 6 illustrates the fields of a media identifier included in the tape manufacturer's data.

Referring to FIG. 6, a subfield 600, at bit positions 26 through 39, contains the servo writer head serial number. A subfield 602, at bit positions 8 through 25, contains the servo write-pass count for the servo write head. A subfield 604, at bit positions 0 through 7, contains the LDAT values at LDAT (23, 22, 21, 20, 19, 18, 17, 16). These subfields (also referred to as media identifier fields) encode a media identifier number that is unique for up to $2^{14}$ (16,348) servo writer heads, each of these servo writer heads writing up to $2^{16}$ (65,536) pancakes with 16.77 kilometers of tape per pancake and the tape length per cartridge being 65.5 meters.

For a given media manufacturer encoding the TMFD data into its media, the servo writer head serial number (also referred to as the servo writer manufacturer serial number or servo writer head FRU serial number), which is written to the subfield 600, typically would not change from media to media. The servo write-pass count for the servo write head (also referred to as the pancake write-pass number), which is written to the subfield 602, changes for each pancake of a given servo writer head. For example, the number may increment by one for each successive pancakes. The LDAT values, which are written to the subfield 604, have a resolution of 65.5 meters (e.g., the tape length within a cartridge). Thus, the TMFD can be static over the length of the pancake, except the media identifier field of the TMFD changing for every cartridge-worth amount of tape length (e.g., every 65.5 meters).

The error correction code contained in the error correction code field 512 may be used to detect and correct errors in the TMFD data-set. The error correction code comprises Reed-Solomon (128, 112) error correction code over Galois Field ($GF(2^8)$). Alternatively, the error correction code comprises any type of BCH coding. As another alternative, the error correction code may comprise a variety of other error correction codes, such as low density parity check (LDPC).

When the error correction code comprises Reed-Solomon over $GF(2^8)$, the calculation of $GF(2^8)$ is based on the following primitive polynomial:

$$P(x)=x^8+x^4+x^3+x^2+1.$$

A primitive element "alpha" in $GF(2^8)$ can be an eight bit binary number (00000010).
The generator polynomial (G(x)) is expressed as:

$$G(x)=(x+1)(x+\text{alpha})(x+\text{alpha}^2)\ldots(x+\text{alpha}^{15}).$$

Note that the roots of G(x) are the consecutive powers of alpha from 0 to 16.

Then the 16 bytes comprising the error correction code (also referred to as redundancy data or redundancy bytes) is the remainder after the polynomial division of the message polynomial (M(x)) by the generator polynomial (G(x)). The message polynomial comprises the polynomial representation of the 112 data bytes of the rest of the TMFD (128 bytes of the TMFD-16 bytes of the error correction code).

Figure 7:
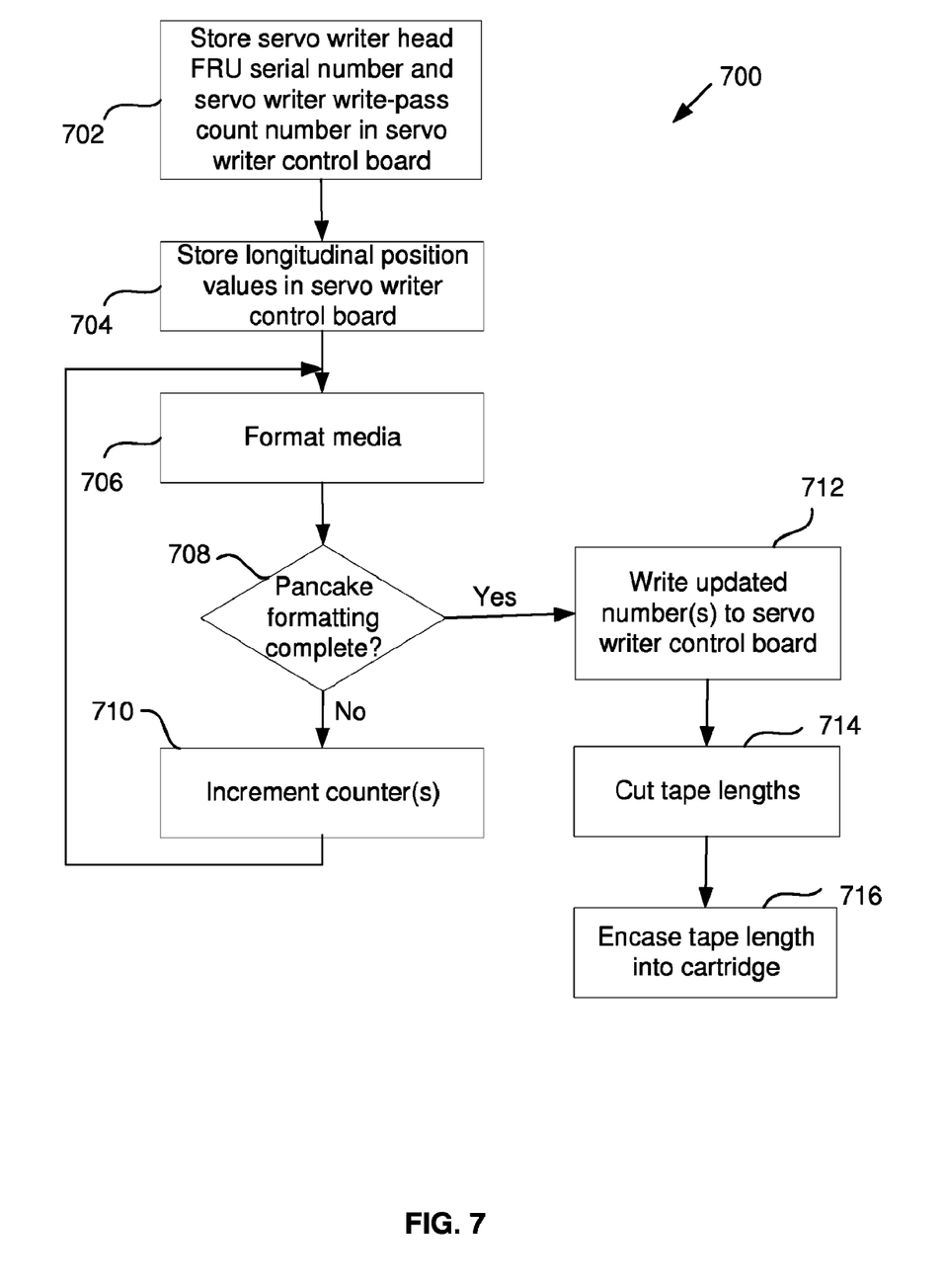
FIG. 7 illustrates a flow diagram for encoding the tape manufacturer's data to the pancake of FIG. 1.

FIG. 7 illustrates a flow diagram 700 of a manufacturer encoding the TMFD during media manufacturing. The encoding scheme includes a store servo writer head serial number and servo-writer write-pass number in a servo writer control board block 702, a store longitudinal position values in the servo writer control board block 704, a format media block 706, a check for completed pancake block 708, an increment counter(s) block 710, a write incremented number to the servo writer control board block 712, a tape cutting block 714, and a tape encasing block 716.

At the block 702, a manufacturer of the servo writer control board assigns a servo writer head FRU serial number and writes it into the non-volatile memory of each of its servo writer control boards. The manufacturer also initializes the servo writer pancake write-pass count to zero and similarly writes it into the non-volatile memory of each of the servo writer control boards.

At the block 704, the manufacturer of the servo writer control board also provides the longitudinal position counter, initializing the count to zero or some other starting value. Other data may also be written to the servo writer control boards by the manufacturer. Once all of the necessary data has been written to the servo writer control boards, they can be delivered to media manufacturers. If there is more than one manufacturer of servo write control boards, each of those manufacturers would assign servo writer head serial numbers so that there are no duplicates across manufacturers or servo write control boards.

Next, at the block 706, the formatted servo writer control boards are used by media manufacturers to format media at the pancake level. Among other things, the servo track of the media for each spool is encoded as discussed above to provide the TMFD data sets. The servo writer head serial number and servo writer pancake write-pass count (and also the longitudinal position values) are accessed from the non-volatile memory of the servo writer control board to encode a cartridge-worth length of tape (continuing the above example, a 65.5 meter segment of tape of the spool).

Once a cartridge-worth length of tape has been encoded, a check is made to see if the pancake has been completely formatted at the block 708. If pancake formatting is incomplete (e.g., there is one or more tape lengths yet to be formatted), then counter(s) are incremented at the block 710 for encoding the next cartridge-worth length of tape of the spool. The servo writer head serial number and the servo writer pancake write-pass count remains the same but the longitudinal position values would be different than for the previous length of tape. Therefore, the servo writer head serial number and the servo writer pancake write-pass count number are unique for each pancake, and when combined with the longitudinal position values, each 65.5 meter segment of tape in any pancake can be uniquely identified.

Next, the process returns to the block 706 to format the next tape length of the pancake.

If pancake formatting has been completed, then at the block 712, updated counter number(s) can be written to the servo writer control board in preparation of formatting the next pancake. For example, the servo writer pancake write-pass count would be incremented and written to the servo writer control board.

At the blocks 714 and 716, the formatted pancake is finished into individual tape cartridges. The pancake is cut to individual tape lengths at the block 714 and then encased into cartridges at the block 716.

It is contemplated that one or more of these blocks may be performed in different order relative to each other and/or simultaneously. For example, a batch of pancakes may be formatted prior to finishing into individual cartridges.

Figure 8:
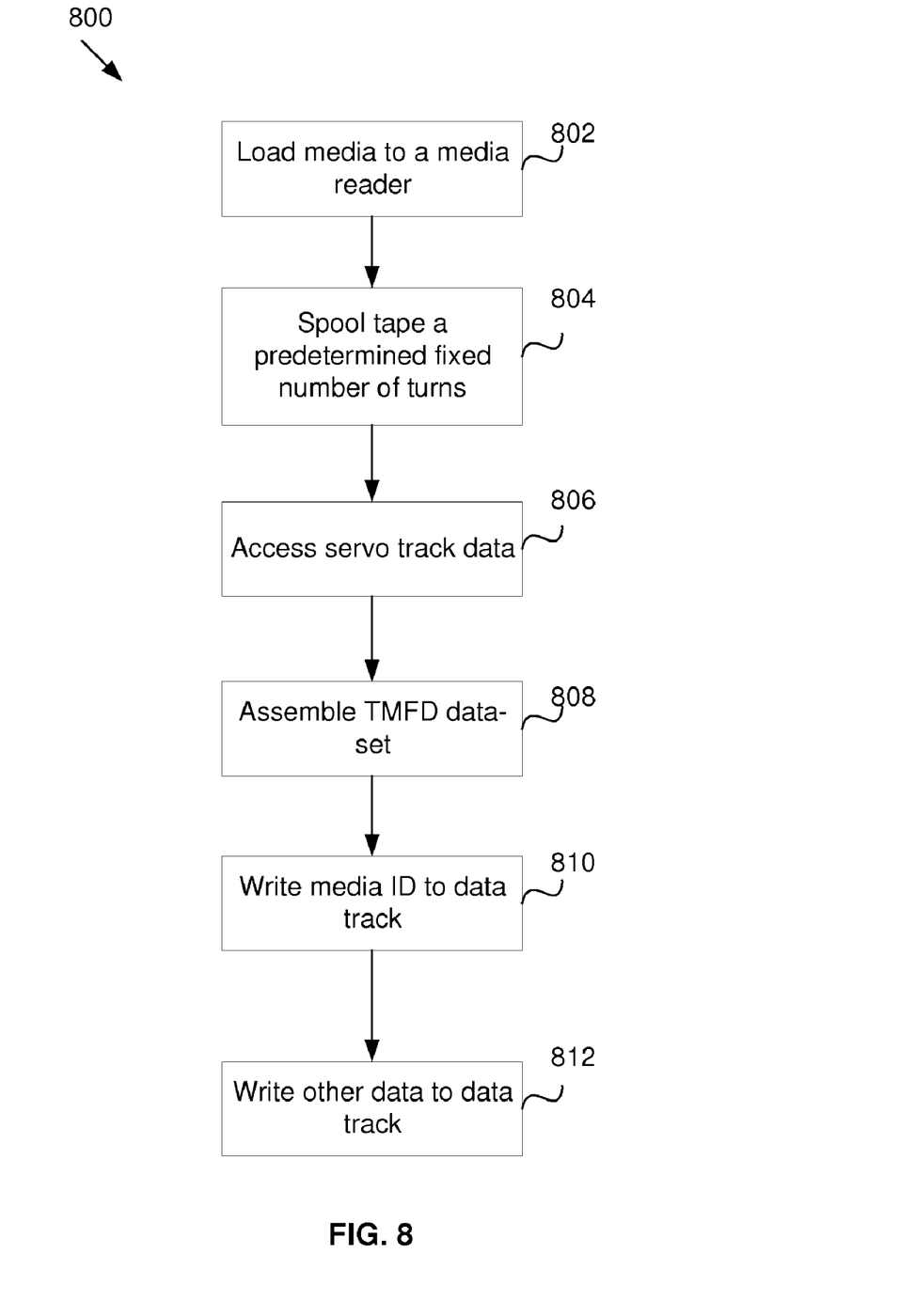
FIG. 8 illustrates a flow diagram for accessing the tape manufacturer's data encoded in a tape cartridge.

FIG. 8 illustrates a flow diagram 800 for accessing the TMFD data set encoded in the tape cartridge. The accessing scheme includes a load media block 802, a spool tape to a specific location of the tape block 804, a read servo track data block 806, an assemble TMFD data set block 808, a write media identifier to data track block 810, and a write other data to data track block 812.

At the block 802, a tape cartridge is loaded to a media reader (e.g., a tape drive) for the first time. Next, at the block 804, the tape is spooled on a take-up reel a predetermined fixed number of turns to where servo track longitudinal data can be read. At the block 806, the servo track data is read, including the TMFD data set represented by the longitudinal words. Once the servo track data has been read, it is assembled into the TMFD data set, as discussed above, at the block 808.

The media identifier included in the TMFD data set also represents a unique cartridge identifier and is written to one or more data tracks of the cartridge at the block 810. In one embodiment, the media identifier may be written to the enhanced medium auxiliary memory (EMAM) field, which is a particular tape directory included in the data tracks. The media identifier establishes a cartridge identifier for that cartridge for all future usage. Once written to the data track, this identifier takes precedence over any media identifier subsequently read from the servo track. In case of the media identifier being at a boundary point, different tape drives being unable to read the servo track, or the servo track being accessed in the middle of the media identifier field, the media identifier may not be properly read from the servo track.

Other data read from the servo track can also be written to (the EMAM field of the) data tracks at the block 812. For example, the longitudinal position at the predetermined fixed number of turns of the take-up reel. This longitudinal position can serve as tape position landmarks from which the BOT and EOT positions for that cartridge can be defined. These landmarks define the cartridge data organization for all future usage.

Although the discussion above assumed a tape length of 65.5 meters and 256 longitudinal words to define a TMFD data set, it is contemplated that the invention can be implemented using different dimensions/units of pancakes, tape lengths, or data fields. Also, if it is desired to increase or decrease the amount of information contained in the TMFD data set, the number of required longitudinal words, for example, can be appropriately varied.

In this manner, a cost effective media identifier scheme is provided that permits unique identification of portable storage media, aids in manufacturing quality feedback, and data encryption. The unique media identifier can be specified during the media manufacturing process. During regular use of the media, the media identifier—which is unique across different manufacturers, different pancakes, and different tape lengths within a pancake—permits unique identification of each of the media to ensure even wear and tear within a set of media, and to associate particular data to a particular cartridge. The media identifier also permits manufacturing process tracing. For example, if particular media exhibit defects or early failure rate, they may be traced back to a particular batch of pancakes and/or manufacturing conditions. Conversely, if particular media exhibit superior qualities, they can similarly be traced back to a particular batch of pancakes and/or manufacturing conditions. In this way, the media manufacturer can refine their material sourcing and/or manufacturing conditions to improve future media. Because the media identifier is a concatenation of numbers known to the manufacturer, using the media identifier as the cartridge identifier (as opposed to assigning consecutive numbers to cartridges in a given library) provides a ready-made encryption tool. For example, reading or writing data to a given cartridge may require entry of the media identifier, which outside persons is unlikely to know.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A magnetic tape media, comprising:
   at least one data track; and
   at least one servo track including at least one media identifier, wherein the media identifier comprises a concatenation of a servo writer head serial number, a servo writer head write-pass count, and a range of magnetic tape longitudinal position values associated with formatting the servo track by a media manufacturer.

2. The magnetic tape media of claim 1, wherein the servo writer, head serial number is constant across different magnetic tape media.

3. The magnetic tape media of claim 1, wherein the servo writer head write-pass count changes for each of a plurality of tape pancakes.

4. The magnetic tape media of claim 1, wherein the longitudinal position values comprise values sixteen through twenty-three.

5. The magnetic tape media of claim 1, wherein the media identifier is unique across different media manufacturers, different pancakes, and different tape lengths within each pancake.

6. The magnetic tape media of claim 1, wherein the servo track comprises a series of servo frames, and wherein the media identifier is encoded in at least a first group of consecutive servo frames and a second group of consecutive servo frames, a third group of consecutive servo frames being located between the first and second groups of consecutive servo frames.

7. A magnetic tape in a single reel tape cartridge, comprising:
   a servo track encoded with a plurality of longitudinal words, wherein each of the longitudinal words defines a tape manufacturer's character, and the tape manufacturer's characters from the plurality of longitudinal words representing tape manufacturer's data including a unique media identifier, and wherein the tape manufacturer's data includes an error correction code.

8. The magnetic tape of claim 7, wherein each of the longitudinal words includes a tape manufacturer's character field and a longitudinal position value field.

9. The magnetic tape of claim 8, wherein the longitudinal position value included in each of the longitudinal words is different from each other.

10. The magnetic tape of claim 7, wherein the servo track comprises a plurality of servo frames and each of the longitudinal words is encoded in four consecutive servo frames.

11. The magnetic tape of claim 7, wherein the unique media identifier comprises a combination of a servo writer head serial number, a servo writer head servo-write pass count, and a range of longitudinal position values.

12. The magnetic tape of claim 7, wherein the unique media identifier is unique across different tape cartridge manufacturers, different pancakes, and different tape lengths within each pancake.

13. The magnetic tape of claim 7, wherein the tape manufacturer's data further comprises at least one of a tape vendor's name, date of servo writing, pancake identifier, and servo writer identifier.

14. The magnetic tape of claim 7, wherein each pair of the tape manufacturer's characters represents an ASCII symbol.

15. The magnetic tape of claim 7, wherein the servo track includes another set of plurality of longitudinal words, wherein the another set of plurality of longitudinal words represents the tape manufacturer's data including an unique media identifier.

16. A method for obtaining tape manufacturer's data from a magnetic tape cartridge, comprising:
   obtaining a first longitudinal word from a first group of servo frames included in the magnetic tape cartridge;
   extracting a first tape manufacturer's character from the first longitudinal word;
   obtaining a second longitudinal word from a second group of servo frames included in the magnetic tape cartridge;
   extracting a second tape manufacturer's character from the second longitudinal word; and
   generating a first segment of the tape manufacturer's data from the first and second tape manufacturer's characters, wherein the first segment of the tape manufacturers data is associated with a media identifier, and wherein the tape manufacturer's data includes an error correction code.

17. The method of claim 16, wherein generating the first segment of the tape manufacturer's data comprises assembling the first tape manufacturer's character as low order values and the second tape manufacturer's character as high order values of an ASCII symbol.

18. The method of claim 17, further comprising: extracting a first longitudinal position value from the first longitudinal word; and extracting a second longitudinal position value from the second longitudinal word, wherein the first longitudinal position value is smaller than the second longitudinal position value.

19. The method of claim 16, further comprising repeating the obtaining and extracting steps to generate the remaining segments of the tape manufacturer's data from the respective pairs of tape manufacturer's characters.

20. The method of claim 16, wherein the tape manufacturer's data comprises 128 ASCII symbols.

21. The method of claim 16, the first and second groups of servo frames are immediately adjacent to each other.

22. The method of claim 16, wherein the tape manufacturer's data includes a base definition identifier specifying the definitions for the rest of the tape manufacturer's data.

23. The method of claim 16, wherein the tape manufacturer's data further includes at least one of a tape vendor's name, date of servo writing, pancake identifier, and servo writer identifier.

24. The method of claim 16, wherein the error correction code comprises Reed-Solomon error correction code.

25. The method of claim 16, wherein the media identifier differentiates between different manufacturers, different tape pancakes, and different tape lengths within each tape pancake.

26. The method of claim 16, wherein the media identifier comprises a concatenation of a servo writer head serial number, a servo writer head servo-write pass count, and a specific range of longitudinal position values.

27. The method of claim 16, further comprising writing the media identifier to at least one data track included in the magnetic tape cartridge.

28. A magnetic tape media, comprising:
at least one data track; and
at least one servo track including at least one media identifier, wherein the servo track comprises a series of servo frames, wherein the media identifier comprises a concatenation of three numbers associated with formatting the servo track by a media manufacturer, and wherein the media identifier is encoded in ten groups of servo frames, wherein the servo frames in each group are consecutive to each other and each group of servo frames are not consecutive to each other.

* * * * *